United States Patent
Senerth et al.

(10) Patent No.: US 12,242,642 B2
(45) Date of Patent: Mar. 4, 2025

(54) PRIVACY PROTECTION FOR ENTERPRISE SYSTEMS

(71) Applicant: Disney Enterprises, Inc., Burbank, CA (US)

(72) Inventors: Mark F. Senerth, Weatogue, CT (US); Jason D. Evans, West Hartford, CT (US); Carmen Nigro, Philadelphia, PA (US); Caleb Jones, Lake Stevens, WA (US)

(73) Assignee: Disney Enterprises, Inc., Burbank, CA (US)

( * ) Notice: Subject to any disclaimer, the term of this patent is extended or adjusted under 35 U.S.C. 154(b) by 517 days.

(21) Appl. No.: 17/518,232

(22) Filed: Nov. 3, 2021

(65) Prior Publication Data

US 2023/0134781 A1 May 4, 2023

(51) Int. Cl.
  *G06F 21/62* (2013.01)
  *H04L 9/06* (2006.01)
  *H04L 9/08* (2006.01)

(52) U.S. Cl.
  CPC ........ *G06F 21/6245* (2013.01); *H04L 9/0643* (2013.01); *H04L 9/0819* (2013.01)

(58) Field of Classification Search
  USPC ........................................................ 726/26
  See application file for complete search history.

(56) References Cited

U.S. PATENT DOCUMENTS

| 10,970,418 | B2* | 4/2021 | Durvasula | G06F 21/6254 |
| 2008/0216174 | A1* | 9/2008 | Vogel | G06F 21/6245 726/22 |
| 2009/0222675 | A1* | 9/2009 | Lange | G06F 21/64 711/216 |
| 2016/0352695 | A1* | 12/2016 | Kozolchyk | H04L 9/40 |
| 2019/0334874 | A1* | 10/2019 | Frost | H04L 63/0272 |

OTHER PUBLICATIONS

S. Josefsson, "The Base16, Base32, and Base64 Data Encodings," Standards Track, Network Working Group, Request for Comments 4648, Dated Oct. 2006, pp. 1-18.

US Department of Commerce, "The Keyed-Hash Message Authentication Code (HMAC)," Information Technology Laboratory, Federal Information Processing Standards Publication 198-1, Dated Jul. 2008, pp. 1-13.

(Continued)

*Primary Examiner* — Sanchit K Sarker
(74) *Attorney, Agent, or Firm* — Patterson + Sheridan, LLP

(57) ABSTRACT

Techniques for electronic privacy protection are disclosed. A first data record is received, including one or more sensitive data fields and one or more non-sensitive data fields. One or more encrypted data fields are generated by encrypting the one or more sensitive data fields using an encryption key. One or more hashed data fields are generated by hashing the one or more sensitive data fields using a hash function. A first mapping is stored, associating at least a portion of the first data record with the encryption key. A second data record is stored, including the one or more non-sensitive data fields, the one or more encrypted data fields, and the one or more hashed data fields.

20 Claims, 8 Drawing Sheets

(56) References Cited

OTHER PUBLICATIONS

US Department of Commerce, "Secure Hash Standard (SHS)," Information Technology Laboratory, Federal Information Processing Standards Publication 180-4, Dated Aug. 2015, pp. 1-36.
US Department of Commerce, "Recommendation for Block Cipher Modes of Operation: Galois/Counter Mode (GCM) and GMAC", National Institute of Standards and Technology Special Publication 800-38D, Dated Nov. 2007, pp. 1-39.

\* cited by examiner

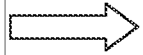

400

| FIELD | VALUE |
|---|---|
| IDENTIFIER_1 | JSMITH@DOMAIN.COM |
| IDENTIFIER_2 | 123-45-6789 |
| IP_ADDRESS | 10.0.0.1 |
| DESTINATION | /THE/PAGE/VISITED?PARAM1=VAL1 |
| TIMESTAMP | 123456789 |

410

| FIELD | VALUE |
|---|---|
| IDENTIFIER_1_HASH | {R*(WENRE_22@KNF} |
| IDENTIFIER_2_HASH | NBN*&*@@RR |
| IP_ADDRESS_HASH | Y3%B(#RD |
| DESTINATION | /THE/PAGE/VISITED?PARAM1=VAL1 |
| TIMESTAMP | 123456789 |
| _ENCRYPTED | |

450

| FIELD | VALUE |
|---|---|
| _EN_KEY_ID | {RBJPIKJSFLJ3434NKNDSLA} |
| IDENTIFIER_1 | AG809AHIORE0IN03 |
| IDENTIFIER_2 | HZ12WE3O4IN2NO4 |
| IP_ADDRESS | 8H*DHF(*FHHHE2@ |

PRIVACY PROTECTION FOR ENTERPRISE SYSTEMS

BACKGROUND

Protecting consumer privacy is a challenging problem. Enterprise privacy protection should both protect sensitive data so that it cannot be tied back to a particular individual, and reduce, to the extent possible, the accessibility of sensitive data within the enterprise platform. This can help reduce data spill and increase protection for sensitive data. An undesirable approach to privacy protection can, however, cause significant problems for an organization. For example, it could create excessive organizational complexity, increasing the probability of costly misconfigurations. An undesirable approach can also have implications on the everyday operational compute costs. A privacy policy that is too restrictive also results in stunting creativity. An enterprise privacy solution should, instead, protect consumer privacy, while avoiding causing problems for the larger organization.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

FIG. 4 illustrates data management for privacy protection for enterprise systems, according to an embodiment.

DETAILED DESCRIPTION

Figure 1:
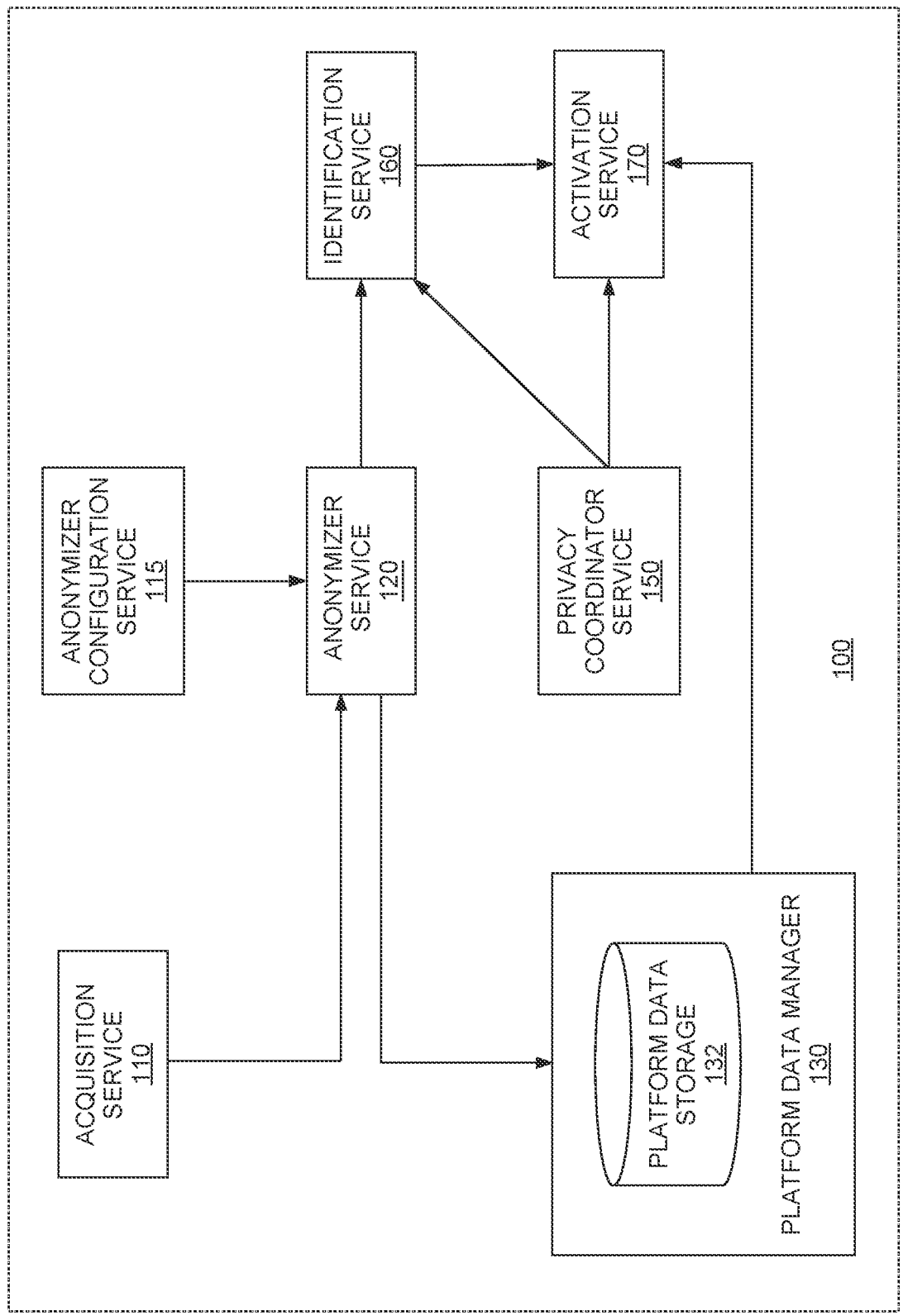
FIG. 1 illustrates an environment for privacy protection for enterprise systems, according to an embodiment.

Solutions to enterprise privacy rely on a "privacy-on-read" model, in which access to sensitive data is protected at access, read, or query time. For example, privacy-on-read can be implemented and enforced via table or SQL views, dynamic masking, table and field permissions, use of proxies, or access controls. These solutions, however, often result in tangled, complex, rules and roles restricting access to the data (e.g., restricting access to particular columns or cells in an electronic database to particular users or user roles). A user's data access needs may change on a daily basis, complicating the ruleset that must be managed to maintain the principle of least privilege. Also, with a privacy-on-read implementation, it is imperative to track the lineage of data across the platform. Data is inherently leaky, which makes the creation and enforcement of any type of role-based access control (RBAC) permission model extremely complex. Further, deletion of sensitive data in these models may require physically removing the data from disk, or filtering or masking the data from view by users. This may be undesirable because physically removing the data from the disk is slow and computationally expensive, resulting in scanning and searching every record in every dataset across the platform. One alternative is to filter and mask the data, which creates a complex web of rules that are prone to errors, and may require vendor lock in.

Enterprise privacy can instead be achieved using a "privacy-on-write" approach that seeks to provide privacy in the way data is written, without relying on privacy-on-read approaches. This can be challenging as well, however, because sensitive data must still be recoverable in a protected way. This can be done through a governed transformation of data (e.g., rather than a governed access to data in a privacy-on-read approach). For example, hashing or encryption can be used at an early stage of the data life-cycle to protect the privacy of data stored on disk. Once hashed or encrypted, sensitive data is protected as stored, without governing direct access to the data and even if access to the data is improperly achieved by a third party (e.g., the data is protected because the third party cannot recreate the original sensitive data from the transformed data as stored).

In an embodiment, as discussed further below, encryption (e.g., symmetric encryption using a secret key) or hashing (e.g., deterministic one-way hashing using a hash secret) can be used to protect sensitive data on disk. But both encryption and hashing have some drawbacks. For example, symmetric encryption can work in two directions, allowing decryption and recovery of encrypted data using a secret key, but may generate a random output for the encrypted data, depending on the type of encryption algorithm used. Some encryption algorithms suggest the use of an initialization vector (e.g., a few random bytes at that are used to make the same input encrypted twice not match the output). This prevents the encrypted bytes from being susceptible to a rainbow attack. Because the same input value results in different output bytes, however, grouping, joins, and aggregations do not work. (e.g., does not allow for joining of database tables on sensitive data fields). Hashing, by contrast, can be deterministic and allow for grouping (e.g., joining) of hashed data. But hashing is understood to work in only one direction, meaning that hashed data cannot be used to recover and activate the original data.

In an embodiment, one or more techniques discussed below relate to a system in which sensitive data is stored in both a hashed and encrypted form. Both forms of stored data are protected, and cannot be directly used to recover the original sensitive data. Further, the hashed form of data can be used for data analytics (e.g., data joins and grouping) because the data hash is deterministic (e.g., given an original value, the hashed value will always be the same). But the hashed form of data cannot be used to recover the original data value (e.g., because the hash is one-way). Instead, the encrypted data can be used to recover the original data. For example, a suitable encryption key can be stored in a secure location and used to recover and activate the original data.

Further, sensitive data can be considered deleted from the system by deleting the associated encryption key, or unlinking the key from the encrypted data, without manipulating the actual sensitive data. For example, as discussed above, sensitive data can be stored in both hashed and encrypted form. In an embodiment, the hash function is a one-way hash function, and cannot be used to recover the original sensitive data from the hashed value. The encrypted data can only be recovered using the associated encryption key. If the encryption key is deleted or lost, the encrypted data cannot be decrypted, and the original sensitive data cannot be recovered. The data can be considered deleted, since it cannot be recovered. Further, aggregated data analytics and reporting (e.g., that depend on the number of stored data records) are not impacted, because the encrypted record for the sensitive data is not removed from disk, and remains stored in the environment.

In an embodiment, using one or more of these techniques has numerous technical advantages. For example, a privacy-on-write approach can improve interoperability among software systems, as compared to a privacy-on-read approach, by eliminating complex rules and user roles needed to govern access to data. The way that RBAC permissions are implemented varies from system to system, requiring maintaining complex rulesets in different locations, or the dependence on a third party. The privacy-on-write approach can reduce development time, eliminate misconfigurations, and allow for a wider variety of interoperable systems. It can also allow for more adaptability and easier improvements to technical systems, as complex access rules and roles do not need to be maintained, and modified, as the system changes. As another example, storing sensitive data in both a hashed and encrypted form provides for less computationally intensive access to, and deletion of, data. Data can be accessed merely by decrypting the data using a mapped encryption key, and can be deleted just by deleting the mapping of the encryption key to the data. Data can be easily grouped based on sensitive data fields (e.g., relational database tables can be joined on sensitive data fields) by using hashed data generated using a deterministic hash function. By removing sensitive information from the entire environment, it allows the creation of new information sets without the possibility of sensitive data leaking from its known location.

FIG. 1 illustrates an environment 100 for privacy protection for enterprise systems, according to an embodiment. In an embodiment, an acquisition service 110 receives data for storage in the environment 100 (e.g., using a platform data storage 132 associated with a platform data manager 130). The acquisition service 110 provides the data to an anonymizer service 120. In an embodiment, the anonymizer service 120 anonymizes the data and then stores the anonymized dataset. For example, as discussed below in relation to FIGS. 3-4, the anonymizer service 120 can identify sensitive data, and can generate hashed values (e.g., using a deterministic one-way hash function with hash secret) and encrypted values (e.g., using symmetric encryption with a secret key) for the data. In an embodiment, anonymizing the data on ingest (e.g., after being received at the acquisition service) has many technical advantages, including reducing the chances that non-anonymized data could be improperly accessed (e.g., by an unauthorized third party) and reducing the need for complex rules about which users, or roles, can access the data. In an embodiment, the data in the acquisition service is governed in a more restrictive way than the data that is stored in the platform data storage 132 which contains entirely anonymized data.

Further, in an embodiment, the anonymizer service 120 is configured by an anonymizer configuration service 115. For example, each dataset to be anonymized can be associated with a configuration file that specifies the sensitive information that needs to be encrypted and hashed by the anonymizer service. The anonymizer configuration service 115 can set various parameters (e.g., configurable hyperparameters) for the anonymizer service 120 using these configuration files. In an embodiment, the sensitive elements to be anonymized are defined in the configuration files in the anonymizer configuration service 115. The configuration files can contain storage locations, network destinations (e.g., for other services), a mechanism to create the encryption key in a distributed manner, and any other suitable information. In an embodiment, the anonymizer configuration service 115 can retrieve configuration information from one or more configuration files (e.g., maintained by managers of data stored in the environment 100).

In an embodiment, the anonymizer service 120 provides the anonymized data to a platform data manager 130. The platform data manager 130 stores the anonymized data in a platform data storage 132. For example, as discussed below in relation to FIG. 4, the platform data storage 132 stores a hashed version, and an encrypted version, of the sensitive data, but does not store the sensitive data in its original form. In an embodiment, the data stored has less restrictive access control policies in place, as the data does not contain any sensitive information. The data stored in platform storage serves as a starting point to downstream systems and analysis. New datasets can be formed without the risk of data leakage.

In an embodiment, the platform data storage 132 is a suitable persistent storage location. For example, the platform data storage 132 can be an electronic database (e.g., a relational database, a graph database, or any other suitable electronic database), a distributed network storage location (e.g., a public-cloud, private-cloud, or hybrid-cloud storage location), a network accessible remote storage location, a local storage location, or any other suitable persistent storage. In an embodiment, because the platform data manager 130 receives the data after it has been processed by the anonymizer service 120, the platform data manager 130 stores only protected versions of any sensitive data in the platform data storage 132 and does not store the sensitive data in an identifiable form.

In an embodiment, a privacy coordinator service 150 can receive a request to delete sensitive data. The privacy coordinator handles the coordination to delete sensitive information in any location that sensitive information is stored. As a request comes in to delete the sensitive information for an individual, the privacy coordinator coordinates with all areas that contain sensitive information. For example, the identification service 160 may maintain the encryption keys for all sensitive data fields. The privacy coordinator coordinates the deletes with the identification service 160, which deletes the encryption key for the sensitive information associated with the key. The activation service 170 can then receive the encrypted data from the platform data manager 130, and can use the encryption key identified by the identification service 160 to decrypt the data and provide it to the requestor.

In an embodiment, the identification service 160 will only serve encryption keys to be used for decryption that are compliant—any deleted keys are not returned. Access to the identification service 160 is strictly governed. In addition to limiting the access to the identification Service 160, the privacy coordinator service 150 can be responsible for keeping track of all datasets that have been converted back to sensitive information in the activation service 170. The datasets that have been converted back into sensitive information can acknowledge delete requests back to the privacy coordinator service 150.

In an embodiment, a privacy coordinator service 150 can further receive a request to delete sensitive data. In an embodiment, the privacy coordinator service 150 can fulfill this request by transmitting a delete request to the identification service 160. As discussed above, in an embodiment sensitive data is not stored at the platform data storage 132. The data is stored in the platform data storage 130 only in encrypted and one-way hashed form. The one-way hash cannot be used to re-create the sensitive data as hash functions are intrinsically one directional (e.g., as a property of the selected hash function). The sensitive data can only be re-created through decryption of the encrypted data stored at the platform data storage 132 by joining to the identification service 160 in order to look up the encryption key for the encrypted data.

In an embodiment, the identification service 160 maintains an encryption mapping for the sensitive data (e.g., mapping the stored encrypted data to the associated encryption key). The identification service 160 consumes the delete requests and removes the corresponding encryption keys from the encryption key map. In an embodiment, this makes it impossible to re-create the sensitive data because the data cannot be decrypted without identifying the associated secret key. In an embodiment, the privacy coordination service 150 validates that the identification service 160 has performed the delete successfully. The privacy coordinator service 150 may be responsible for keeping track of all deletes that were applied both across the platform and outside the platform. The privacy coordinator service 150 also creates a log to be used for alerting and attribution to allow us to follow up on any registered activation services that did not apply the delete request and acknowledge, due to error or otherwise.

In an embodiment, the environment 100 can be implemented using any suitable combination of physical devices, cloud compute nodes and storage locations, or any other suitable implementation. For example, the environment 100 could be implemented using a server or cluster of servers (e.g., maintained by the data owner). As another example, the environment 100 can be implemented using a combination of compute nodes and storage locations in a suitable cloud environment. For example, one or more of the components of the environment 100 can be implemented using a public cloud, a private cloud, a hybrid cloud, or any other suitable implementation. The only thing that would change between the different hardware would be the medium for data access control, which could be handled differently for on premises storage than it would in a cloud computing environment.

As discussed above, in an embodiment the anonymizer service 120 can be used to anonymize acquired data for storage using the platform data manager 130. In an embodiment, the original data from the acquisition service 110 can be vaulted prior to anonymization. The access to the vault is extremely restrictive, and only used for very limited purposes (e.g., disaster recovery). For example, the original data can be maintained in cold storage (e.g., not directly accessible through a networked computing system) and retrieved only in the event of a catastrophic failure. Access to the vaulted data can be tightly governed (e.g., for data recovery or large back-processing use cases only).

Figure 2:
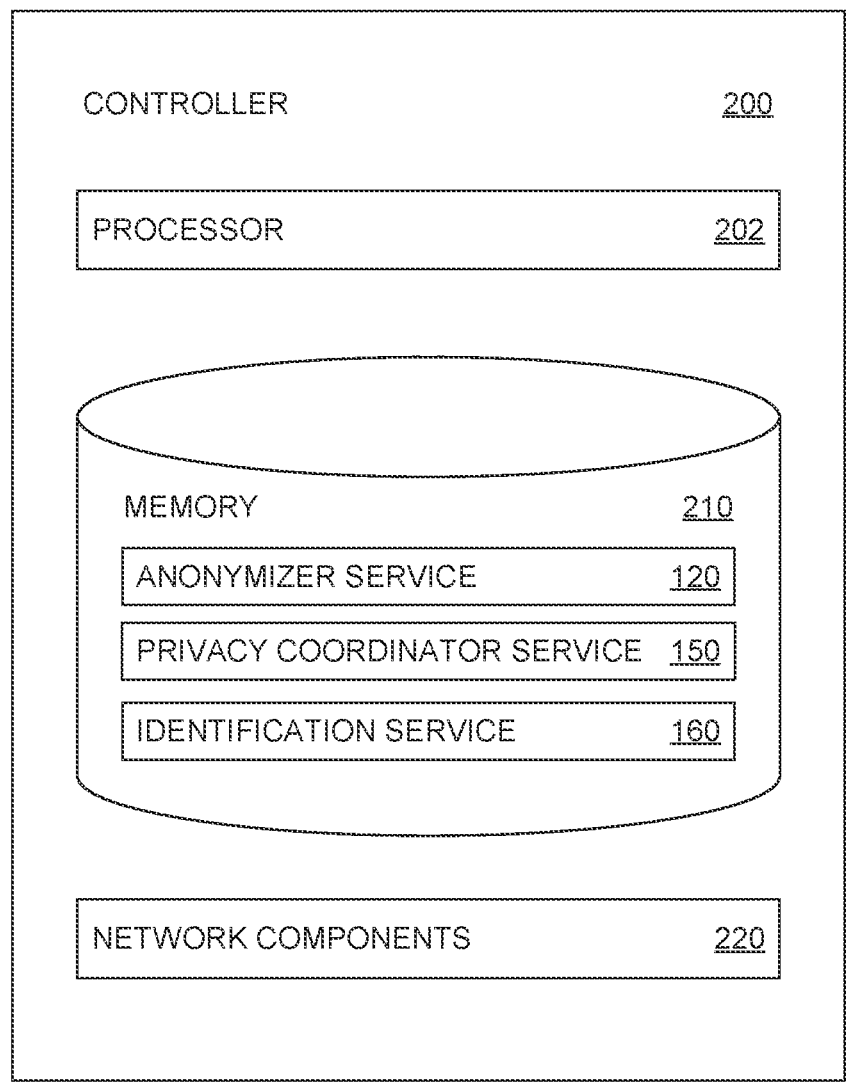
FIG. 2 is a block diagram illustrating a controller for privacy protection for enterprise systems, according to an embodiment.

FIG. 2 is a block diagram illustrating a controller 200 for privacy protection for enterprise systems, according to an embodiment. The controller 200 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the controller 200 to interface with a suitable communication network (e.g., a communication network interconnecting various components of the environment 100 illustrated in FIG. 1, or interconnecting the environment 100 with other computing systems). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the 200. The program code is generally described as various functional "applications" or "modules" within the memory 210, although alternate implementations may have different functions and/or combinations of functions. Within the memory 210, the anonymizer service 120 facilitates anonymizing sensitive data (e.g., generating hashed and encrypted versions of the data), the privacy coordinator service 150 facilitates coordinating, validating and making sure that all delete requests are processed and acknowledged across all activation services, and the identification service 160 facilitates the storage of the encryption mapping for the sensitive data (e.g., mapping encryption keys to stored encrypted data). This is discussed further below with regard to FIGS. 3-8.

While the controller 200 is illustrated as a single entity, in an embodiment, the various components can be implemented using any suitable combination of physical services, cloud compute nodes and storage locations, or any other suitable implementation. For example, the controller 200 could be implemented using a server or cluster of servers (e.g., maintained by the data owner). As another example, the controller 200 can be implemented using a combination of compute nodes and storage locations in a suitable cloud environment. For example, one or more of the components of the controller 200 can be implemented using a public cloud, a private cloud, a hybrid cloud, on premises cluster, or any other suitable implementation.

Figure 3:
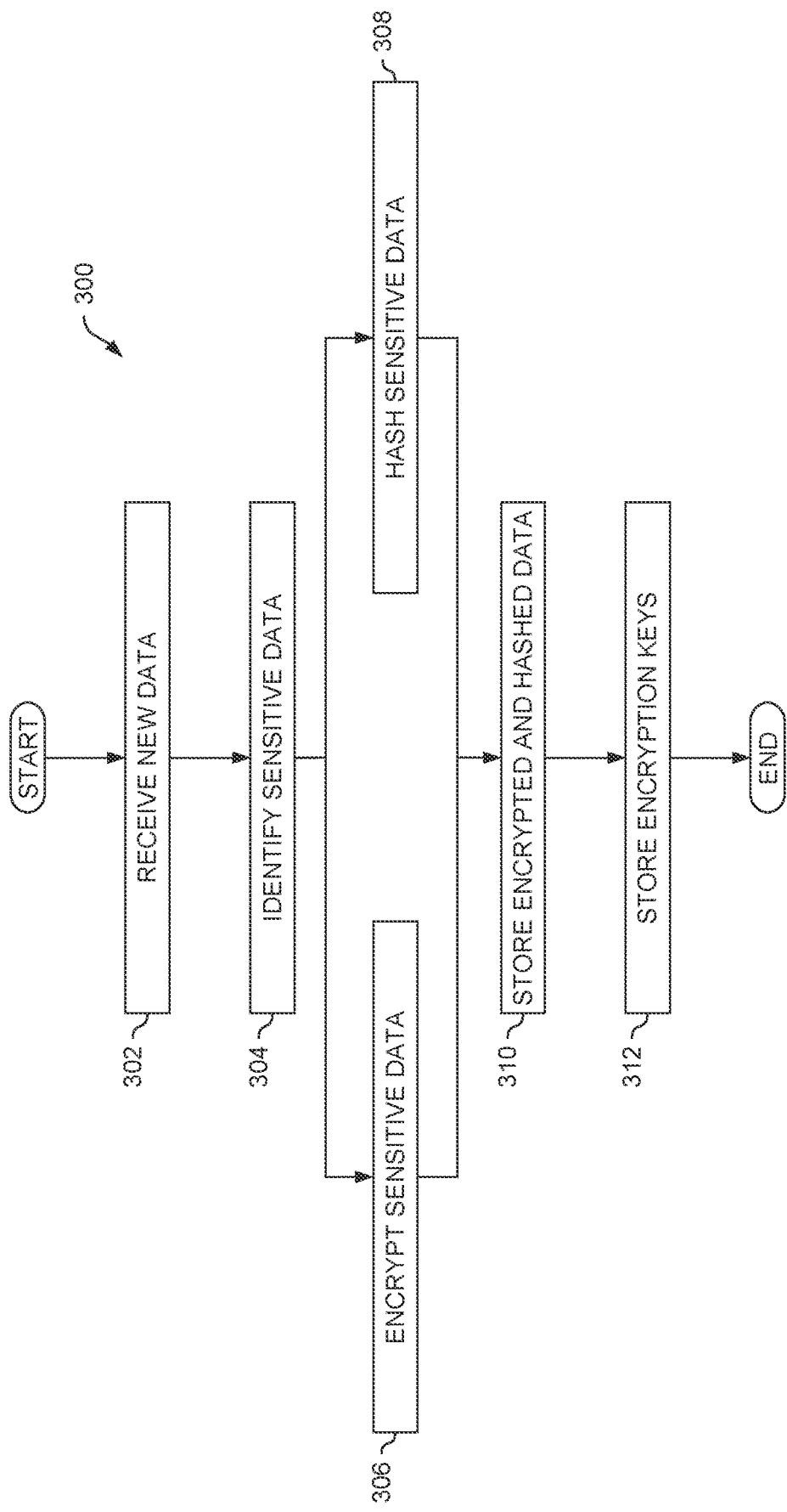
FIG. 3 is a flowchart illustrating acquiring data and protecting privacy for enterprise systems, according to an embodiment.

FIG. 3 is a flowchart 300 illustrating acquiring data and protecting privacy for enterprise systems, according to an embodiment. At block 302, an anonymizer service (e.g., the anonymizer service 120 illustrated in FIGS. 1-2) receives new data. For example, as illustrated in FIG. 1, the anonymizer service can receive newly acquired data, including sensitive data.

At block 304, the anonymizer service identifies sensitive data (e.g., among the newly received data). In an embodiment, the anonymizer service can identify sensitive personal information (PI) (e.g., which has been pre-configured in the configuration based input files), sensitive personally identifiable information (PII), or any other suitable sensitive information. For example, PII has been defined by governmental entities as information which can be used to distinguish or trace an individual's identity, such as their name, social security number, biometric records, etc. alone, or when combined with other personal or identifying information which is linked or linkable to a specific individual, such as date and place of birth, mother's maiden name, etc.

In an embodiment, a data manager can define data fields (e.g., name, social security number, etc.) as containing sensitive information (e.g., PII). The anonymizer service can then identify whether the acquired data includes sensitive information. For example, the anonymizer service can use one or more configuration files (e.g., as discussed above in relation to FIG. 1) to identify data fields including sensitive information.

At block 306, the anonymizer service encrypts sensitive data. In an embodiment, the anonymizer service can use a suitable symmetric encryption technique to encrypt the sensitive data. For example, the anonymizer service can encrypt the sensitive data and generate a random cipher output (e.g., using 256 bit Advanced Encryption Standard with Galois Counter Mode (AES-256 GCM) with random initialization vector (random IV)). In an embodiment, this is not deterministic, meaning the encryption technique generates a different random cipher for a given original value, each time the original value is encrypted. This is important to protect the encrypted values against a rainbow attack. The encryption can be symmetric, meaning that decryption and encryption can be performed using the same secret key. Further, the encryption can be private, such that the cipher text does not reveal any information about the secret key or the original value. Without the encryption key used to encrypt the information, it is not possible to decrypt the information.

Further, in an embodiment, the anonymizer service can use encryption keys that map to the sensitive data. For example, each record, or row, in the acquired data can be assigned a primary identifier selected from the PI for that record. All sensitive data for a given record (e.g., all PI and PII) can be encrypted using a secret key derived from the primary identifier. For example, the encryption key for a given record can be generated using: hash (primary_ID, encryption_key_secret). The encryption key can be mapped to an encryption key identifier, generated using: hash (primary_ID, hash_secret). In an embodiment, hash_secret is used to hash sensitive data, as discussed below in relation to block 308, while encryption_key_secret is a different value used to generate encryption keys. In an embodiment, primary identifiers can be maintained as an individual field (e.g., in a suitable electronic database table), can be indexed in an array, a regex substring, or any other suitable location. Further, primary identifiers can be selected from PI associated with the record using a hierarchy of PI defined for primary identifier selection. The encryption key for each record in the dataset is created in a distributed fashion, using the primary identifier in the individual record as an input to the encryption key. The encryption key is created by combining the primary identifier with the encryption salt and creating a hash. If a datapoint does not exist within the record, all configured datapoints in the hierarchy are evaluated in order to choose the primary identifier to be used in the creation of the encryption key.

In an embodiment, encryption keys can further be mapped per data segment. For example, a given item of sensitive data could be associated with multiple segments within a data storage environment (e.g., the environment 100 illustrated in FIG. 1). In an embodiment, segments can be any suitable division within the environment, including different business units, different entities accessing the stored data, etc. Part of the functionality of the identification service (160 in FIG. 1) is to arrange the keys in a way that will support applying delete requests based on any type of segmentation scheme. The activation service (170 in FIG. 1) can, for example, be associated with a particular segment, and can access data associated with that segment, using encryption keys, through the identification service (e.g., the activation service can identify as a particular segment and can join to a materialization for that segment in the identification service). As discussed further below, this capability provides significant flexibility by allowing effective per-segment deletion of data through removal of encryption mapping for that segment.

In an embodiment, this facilitates deleting sensitive data on a per-segment basis. For example, a particular segment (e.g., a particular business unit) could request deletion of a given item of sensitive data for that business unit (e.g., such that requestors associated with that business unit can no longer access the sensitive data). The privacy coordinator service (150 in FIG. 1) can identify the encryption mapping at the individual segment that the delete request originated from—and the identification service (160 in FIG. 1) can apply the delete request only to the specific segment. The identification service (160 in FIG. 1) then acknowledges that the delete request has been applied correctly to the privacy coordinator service (150 in FIG. 1). The same data that is anonymized and stored in platform data storage (132 in FIG. 1) will no longer be able to be activated upon in the activation service (170 in FIG. 1) for the particular segment activation. In an embodiment a global delete is also supported, removing the ability to re-identify by removing the encryption mapping from all of the segments stored in the identification service (160 in FIG. 1).

At block 308 in FIG. 3, the anonymizer service hashes the sensitive data. In an embodiment, the anonymizer service can use a hash function that is deterministic, such that given the same input, the hash function always produces the same output (e.g., in contrast to the non-deterministic encryption described above in relation to block 306 in FIG. 3). Further, the anonymizer service can use a hash function that is efficient (e.g., computationally inexpensive).

For example, the anonymizer service can use a Secure Hash Algorithm 2 (SHA-2) hash function (e.g., SHA-256). The anonymizer service can further use a hash function that is one-way, such that it is impossible, or computationally impractical, to derive an original value from the associated hash value. Finally, the anonymizer service can use a uniform hash function, which generates hash values that evenly distribute across the possible hash values and minimize collisions (e.g., minimize two different original values producing the same hash value).

Further, in an embodiment, the anonymizer service can use a hash secret as part of hashing the sensitive data. In an embodiment, a hash secret is combined with the sensitive data (e.g., prepended or appended to the original sensitive data before hashing), and then the combined data and hash secret is hashed, using the chosen hash function, to generate the hashed value. Use of a hash secret prevents indexing into the sensitive data by an actor with access to a portion of the data. For example, without use of a hash secret, a third-party actor with original sensitive data that is stored in the platform data storage (130 in FIG. 1) could use a hash function to index into the stored hashed data (e.g., because the hash function is deterministic) if they were to figure out exactly which hash function is being used during the hashing phase of anonymization of data (308 in FIG. 3). Use of a hash secret prevents this, because the third party does not have access to the hash secret and so cannot generate the correct hash from a given piece of original data. In an embodiment, the hash secret is kept secret and is stored in a secured vault location with extremely limited access.

At block 310, the anonymizer service stores the encrypted and hashed data. This is discussed further with regard to FIG. 4, below. For example, the anonymizer service can store the encrypted and hashed data in a suitable persistent storage location (e.g., the platform data storage 132 illustrated in FIG. 1).

At block 312, the anonymizer service stores the encryption keys, as well as the encryption id associated with the sensitive data. As discussed above, in an embodiment, the anonymizer service can encrypt all sensitive data for a given record (e.g., all PI and PII) using a secret key derived from a primary identifier associated with that record. The anonymizer service, or another suitable service (e.g., the identification service 160 illustrated in FIGS. 1-2) can store these encryption keys in a persistent storage location that is not associated with the encrypted sensitive data record, as long as the access control to the encryption keys is separated from the access control to the encrypted data. Further, the identification service (160 in FIG. 1), or other suitable service, can store an encryption mapping of each secret key to the associated record. In an embodiment, the secret key is not stored with the associated sensitive data, and the secret key associated with a given record cannot be identified without the encryption mapping.

FIG. 4 illustrates data management 400 for privacy protection for enterprise systems, according to an embodiment. In an embodiment, an acquired data record 410 includes five data fields (e.g., five rows in a database table): Identifier_1, Identifier_2, IP_Address, Destination, and Timestamp. The fields Identifer_1, Identifier_2, and IP_Address include sensitive data (e.g., sensitive PII). The fields Destination and Timestamp are non-sensitive.

In an embodiment, an anonymizer service (e.g., the anonymizer service 120 illustrated in FIGS. 1-2) generates a protected data record 450. As illustrated, protected data record 450 includes non-sensitive data in its original form. For example, the fields Destination and Timestamp in the acquired data record 410 are not sensitive, and so they are included in the protected data record 450 in their original form.

The protected data record 450 includes, however, both hashed and encrypted versions of the sensitive data fields, and does not include the sensitive data in its original form. For example, the anonymizer service uses a suitable hash function (e.g., as described above in relation to block 308 illustrated in FIG. 3) to generate hashed data fields: Identifier_1_Hash, Identifier_2_Hash, and IP_Address_Hash. The renaming of the field name is only for illustrative purposes, the field name can be the same between FIGS. 410 and 450 in FIG. 4. As discussed above, in an embodiment the anonymizer service uses a deterministic one-way hash function, such that the same value in Identifier_1 always generates the same value in Identifier_1_Hash, but the value in Identifier_1_Hash cannot be used to recreate the value in Identifier_1. That is, the hash of the value in Identifier_1 is deterministic, but cannot be used to recreate the sensitive data.

As another example, the anonymizer service uses a suitable encryption technique (e.g., as discussed above in relation to block 306 illustrated in FIG. 3) to generate an encrypted data structure: _encrypted. In an embodiment, the structure _encrypted (e.g., an electronic database field) includes an object 452 (e.g., a database object). The object 452 includes encrypted values corresponding to the sensitive data fields: Identifier_1, Identifier_2, and IP_Address from 410 in FIG. 4. The object 452 further includes an identifier, _en_key_id that can be used to identify the encryption key used to generate the encrypted data. In an embodiment, the _en_key_id is generated from a primary identifier using: hash (primary_ID, hash_secret). As discussed above, the primary identifier can be selected from PI (e.g., non-sensitive PI) associated with the record using a hierarchy of PI defined for primary identifier selection.

Figure 5:
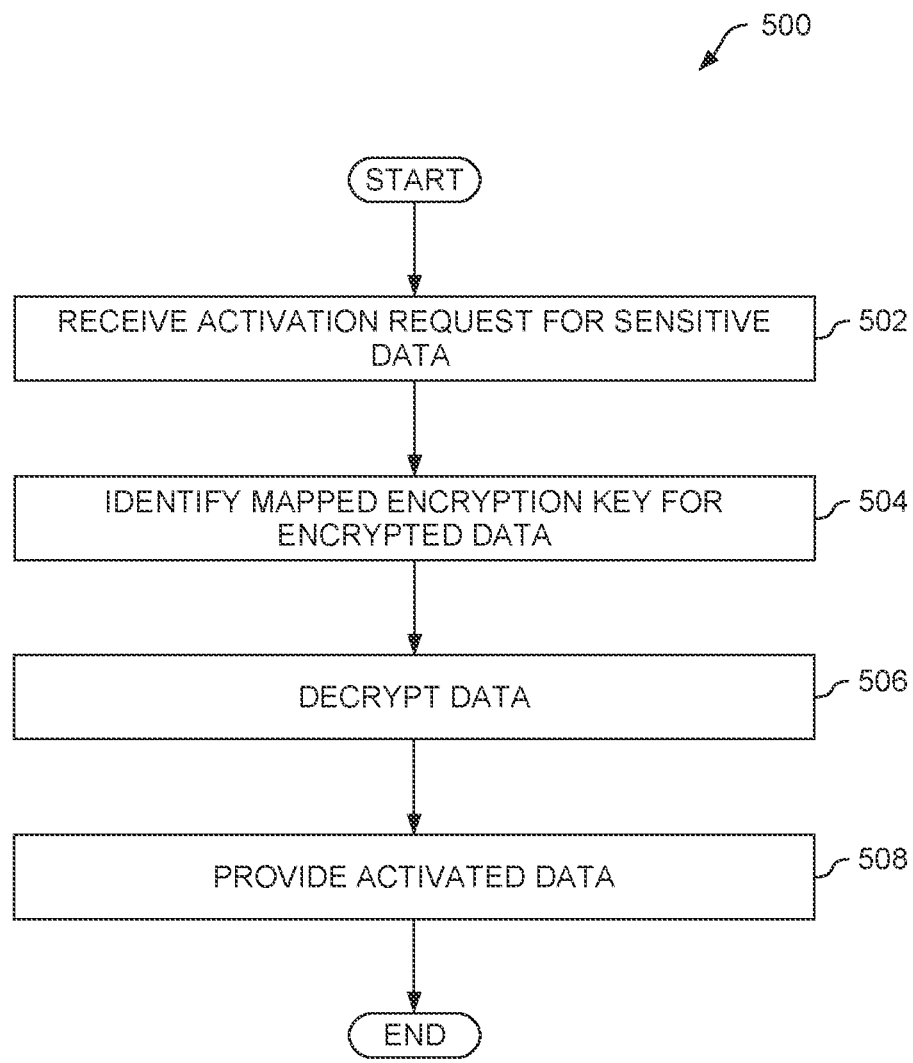
FIG. 5 is a flowchart illustrating activating data in a system with privacy protection for enterprise systems, according to an embodiment.

FIG. 5 is a flowchart 500 illustrating activating data in a system with privacy protection for enterprise systems, according to an embodiment. At block 502 a privacy coordinator service (e.g., the privacy coordinator service 150 illustrated in FIGS. 1-2) receives an activation request for sensitive data. In an embodiment, the privacy coordinator service keeps a registry of all activation services so the service can verify that deletes have been performed appropriately. The activation service, or downstream services must apply deletes that have been requested, and acknowledge to the privacy coordinator service.

The privacy coordinator service can further request that an identification service perform a delete of any data that has been re-identified and stored in un-encrypted/unhashed form. The privacy coordinator is also responsible for tracking all systems downstream from the activation service. (e.g., the identification service 160 illustrated in FIGS. 1-2). For example, as illustrated in FIG. 1, the privacy coordinator service can allow the activation service (e.g., the activation service 170 illustrated in FIGS. 1-2) to activate the sensitive data to transform the encrypted data back into the raw form by joining to the identification service (160 in FIG. 1).

At block 504, the identification service identifies the mapped encryption key for the encrypted data, if the identification service contains the encryption key for the requested encryption id. Any encryption ids that have been previously deleted will result in the encryption key not being returned. For example, as discussed above in relation to block 312 illustrated in FIG. 3, the identification service can maintain a mapping between encryption keys (e.g., stored encryption keys) and stored encrypted data. In an embodiment, the identification service uses this mapping to identify the encryption key associated with the requested sensitive data.

At block 506, an activation service (e.g., the activation service 170 illustrated in FIG. 1) decrypts the requested sensitive data. For example, the activation service can use the mapping identified by the identification service at block 504 to identify the encryption key associated with the requested data. In an embodiment the encryption is symmetric (e.g., as discussed above in relation to block 306 illustrated in FIG. 3), so that the encryption key used to encrypt the sensitive data can also be used to decrypt the sensitive data. The activation service can, for example, join the encrypted data with the encryption mapping on the encryption identifier. At block 508, the activation service then provides the activated (e.g., decrypted) sensitive data.

Figure 6:
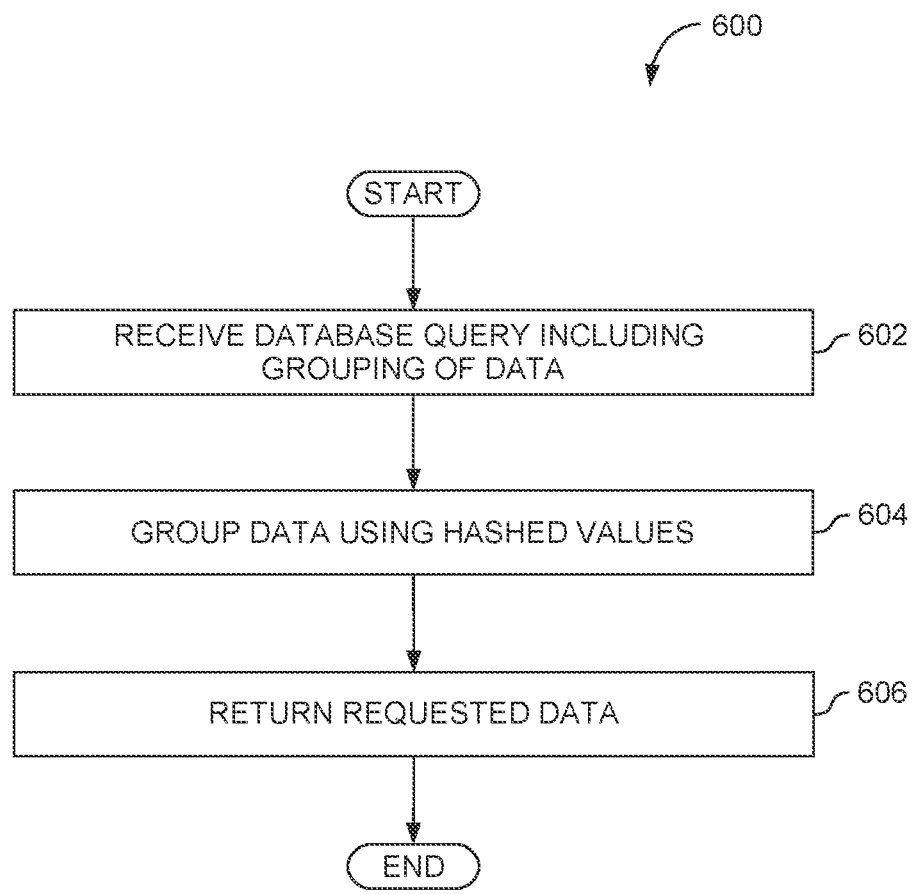
FIG. 6 is a flowchart illustrating grouping sensitive data in a system with privacy protection for enterprise systems, according to an embodiment.

FIG. 6 is a flowchart 600 illustrating grouping sensitive data in a system with privacy protection for enterprise systems, according to an embodiment. At block 602, a privacy coordinator service (e.g., the privacy coordinator service 150 illustrated in FIGS. 1-2) receives a database query including grouping of data (e.g., a table join in a relational database). The privacy coordinator service is merely one example, and any suitable service can be used.

At block 604, the privacy coordinator service groups data using hashed values. As discussed above in relation to block 306 illustrated in FIG. 3, in an embodiment sensitive data is hashed using a deterministic hash function. This means that a given field of sensitive data is guaranteed to be stored as the same hash value. Because of this, the sensitive data can be grouped using the hashed values. For example, database tables in a relational database can be joined using a hashed identifier value, because the hashed values for a give item of sensitive data are guaranteed to be the same in both tables. At block 606, the privacy coordinator service returns the requested data (e.g., the data identified by grouping the sensitive data).

Figure 7:
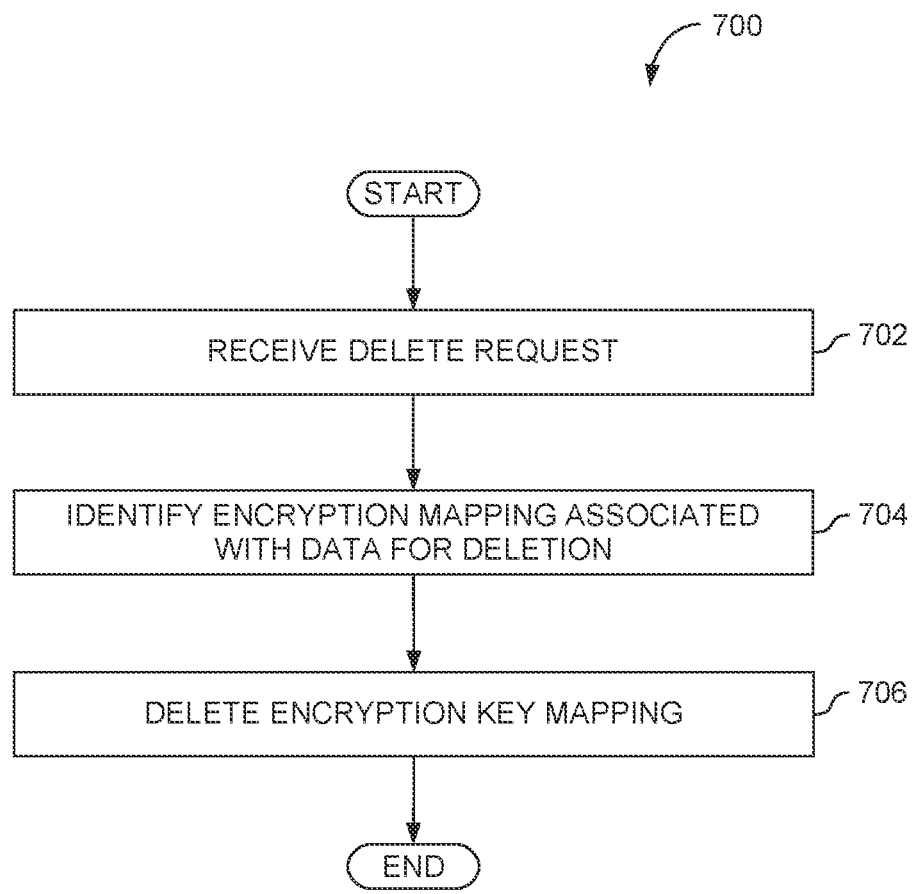
FIG. 7 is a flowchart illustrating deleting data in a system with privacy protection for enterprise systems, according to an embodiment.

FIG. 7 is a flowchart 700 illustrating deleting data in a system with privacy protection for enterprise systems, according to an embodiment. At block 702, a privacy coordinator service (e.g., the privacy coordinator service 150 illustrated in FIGS. 1-2) receives a request to delete an item of sensitive data. At block 704, the privacy coordinator service identifies the encryption mapping associated with the data for deletion. For example, the privacy service can request the encryption mapping (e.g., a mapping of the requested encrypted sensitive data to its associated encryption key) from a suitable identification service (e.g., the identification service 160 illustrated in FIG. 1).

At block 706, the privacy coordinator service triggers the delete for the encryption mapping either for a segment, or a global delete. In an embodiment, this deletes access to the data because the encrypted data can no longer be decrypted, as the encryption key no longer exists. Alternatively, or in addition, as discussed above in relation to block 306 illustrated in FIG. 3, the encryption mapping can be done on a per-segment basis (e.g., per business unit for the entity maintaining the data). That is, the identification service can maintain an encryption mapping for a given item of sensitive data and multiple segments. In this example, deleting the encryption mapping associated with a given segment deletes access to the data for that segment (e.g., because the encryption mapping for that segment is deleted), but the data may still be accessible to other segments.

Figure 8:
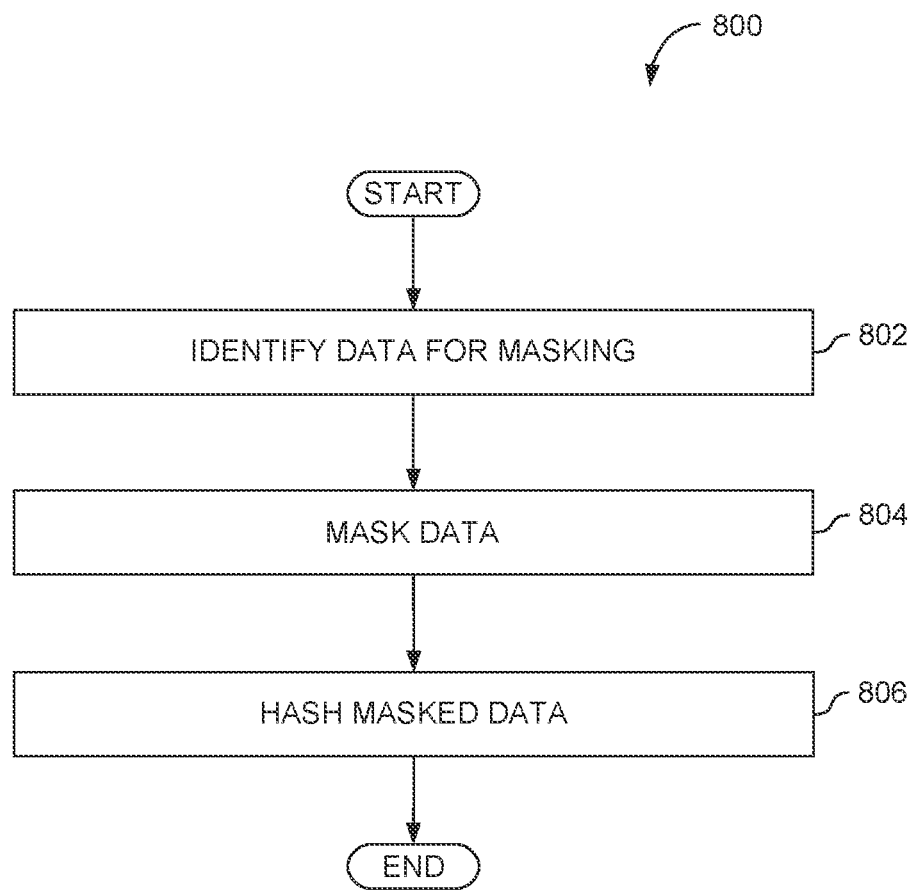
FIG. 8 is a flowchart illustrating masking data for privacy protection for enterprise systems, according to an embodiment.

FIG. 8 is a flowchart 800 illustrating masking data for privacy protection for enterprise systems, according to an embodiment. At block 802, an anonymizer service (e.g., the anonymizer service 120 illustrated in FIGS. 1-2) identifies data for masking. In an embodiment, masking can be used to further protect sensitive data. For example, masking can preserve a portion of sensitive data while rendering the result no longer sensitive. Examples include truncating postal codes (e.g., from five digits to three digits), truncating phone numbers (e.g., to area code only), truncating birthdates (e.g., to year only), geographic coordinates, IP addresses, grouping postal codes, or any other suitable masking. Data suitable for masking can be identified using information security guidelines (e.g., governmental guidelines) using any other suitable source.

At block 804, the anonymizer service masks the data. For example, as discussed above a five digit postal code can be masked to include only three digits (e.g., the first three digits). At block 806, the anonymizer service hashes the masked data. For example, as discussed above in relation to block 308 illustrated in FIG. 3, the anonymizer service can use a suitable hash function to generate a deterministic, one-way, hash of the masked data. The hash can then be stored (e.g., as discussed above in relation to FIG. 4).

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   receiving a first data record comprising one or more sensitive data fields and one or more non-sensitive data fields;
   generating an encrypted version of the one or more sensitive data fields by encrypting the one or more sensitive data fields using an encryption key;
   generating a one-way hashed version of the one or more sensitive data fields by hashing the one or more sensitive data fields using a one-way hash function, wherein the one-way hash function comprises one-way hashing in which the one or more sensitive data fields cannot be recovered from the one or more hashed data fields;
   storing a second data record comprising all three of: (i) the one or more non-sensitive data fields, (ii) the encrypted version of the one or more sensitive data fields, and (iii) the one-way hashed version of the one or more sensitive data fields hashed using the one-way hash function, wherein the one or more sensitive data fields in an original form are not stored in the second data record; and
   storing a first mapping associating the encrypted version of the one or more sensitive data fields with the encryption key to enable access to the one or more sensitive data fields via the second data record.

2. The method of claim 1, further comprising:
   receiving a request for the one or more sensitive data fields;
   retrieving the first mapping, based on at least a portion of the first data record;
   determining the encryption key using the mapping; and
   decrypting the encrypted version of the one or more sensitive data fields using the encryption key.

3. The method of claim 2, wherein the first mapping associates a primary identifier relating to the first data record with the encryption key, and wherein retrieving the first mapping is based on the primary identifier.

4. The method of claim 1, further comprising:
   receiving a request to delete the one or more sensitive data fields;
   identifying the first mapping, based on at least a portion of the first data record; and
   deleting the first mapping associated with the encryption key, wherein the encrypted version of the one or more sensitive data fields remain stored after the deleting the first mapping.

5. The method of claim 4, wherein the first mapping is one of a plurality of mappings associating the at least a portion of the first data record with the encryption key.

6. The method of claim 4, wherein the first mapping is the only mapping associating the at least a portion of the first data record with the encryption key.

7. The method of claim 1, wherein the first mapping is stored at a different location from the second data record.

8. The method of claim 1, further comprising:
   receiving a request for at least a portion of the first data record;
   grouping the first data record with a plurality of other data records using the one-way hashed version of the one or more sensitive data fields; and
   returning a response to the request, based on the grouping.

9. The method of claim 8, wherein the grouping comprises a join operation using the one-way hashed version of the one or more sensitive data fields.

10. The method of claim 1, further comprising:
    masking a first sensitive data field of the one or more sensitive data fields, wherein the one-way hashed version of the one or more sensitive data fields is generated using the masked data field.

11. The method of claim 10, wherein the masking comprises truncating the first sensitive data field.

12. A non-transitory computer-readable medium containing computer program code that, when executed by operation of one or more computer processors, performs an operation comprising:
    receiving a first data record comprising one or more sensitive data fields and one or more non-sensitive data fields;
    generating an encrypted version of the one or more sensitive data fields by encrypting the one or more sensitive data fields using an encryption key;
    generating a one-way hashed version of the one or more sensitive data fields by hashing the one or more sensitive data fields using a one-way hash function, wherein the one-way hash function comprises one-way hashing in which the one or more sensitive data fields cannot be recovered from the one or more hashed data fields;

storing a second data record comprising all three of: (i) the one or more non-sensitive data fields, (ii) the encrypted version of the one or more sensitive data fields, and (iii) the one-way hashed version of the one or more sensitive data fields hashed using the one-way hash function, wherein the one or more sensitive data fields in an original form are not stored in the second data record; and storing a first mapping associating the encrypted version of the one or more sensitive data fields with the encryption key to enable access to the one or more sensitive data fields via the second data record.

13. The non-transitory computer-readable medium of claim 12, the operation further comprising:
receiving a request for the one or more sensitive data fields;
retrieving the first mapping, based on at least a portion of the first data record;
determining the encryption key using the mapping; and
decrypting the encrypted version of the one or more sensitive data fields using the encryption key.

14. The non-transitory computer-readable medium of claim 12, the operation further comprising:
receiving a request to delete the one or more sensitive data fields;
identifying the first mapping, based on at least a portion of the first data record; and
deleting the first mapping associated with the encryption key, wherein the encrypted version of the one or more sensitive data fields remain stored after the deleting the first mapping.

15. The non-transitory computer-readable medium of claim 12, the operation further comprising:
receiving a request for at least a portion of the first data record;
grouping the first data record with a plurality of other data records using the one-way hashed version of the one or more sensitive data fields; and
returning a response to the request, based on the grouping.

16. The non-transitory computer-readable medium of claim 12, the operation further comprising:
masking a first sensitive data field of the one or more sensitive data fields, wherein the one-way hashed version of the one or more sensitive data fields is generated using the masked data field.

17. A system, comprising:
a computer processor; and
a memory having instructions stored thereon which, when executed on the computer processor, performs an operation comprising:

receiving a first data record comprising one or more sensitive data fields and one or more non-sensitive data fields;
generating an encrypted version of the one or more sensitive data fields by encrypting the one or more sensitive data fields using an encryption key;
generating a one-way hashed version of the one or more sensitive data fields by hashing the one or more sensitive data fields using a one-way hash function, wherein the one-way hash function comprises one-way hashing in which the one or more sensitive data fields cannot be recovered from the one or more hashed data fields;
storing a second data record comprising all three of: (i) the one or more non-sensitive data fields, (ii) the encrypted version of the one or more sensitive data fields, and (iii) the one-way hashed version of the one or more sensitive data fields hashed using the one-way hash function, wherein the one or more sensitive data fields in an original form are not stored in the second data record; and
storing a first mapping associating the encrypted version of the one or more sensitive data fields with the encryption key to enable access to the one or more sensitive data fields via the second data record.

18. The system of claim 17, the operation further comprising:
a request for the one or more sensitive data fields;
retrieving the first mapping, based on at least a portion of the first data record;
determining the encryption key using the mapping; and
decrypting the encrypted version of the one or more sensitive data fields using the encryption key.

19. The system of claim 17, the operation further comprising:
receiving a request to delete the one or more sensitive data fields;
identifying the first mapping, based on at least a portion of the first data record; and
deleting the first mapping associated with the encryption key, wherein the encrypted version of the one or more sensitive data fields remain stored after the deleting the first mapping.

20. The system of claim 17, the operation further comprising:
masking a first sensitive data field of the one or more sensitive data fields, wherein the one-way hashed version of the one or more sensitive data fields is generated using the masked data field.

* * * * *